No. 884,206. PATENTED APR. 7, 1908.
C. R. REEVES.
CAR FENDER.
APPLICATION FILED AUG. 8, 1907.
2 SHEETS—SHEET 1.
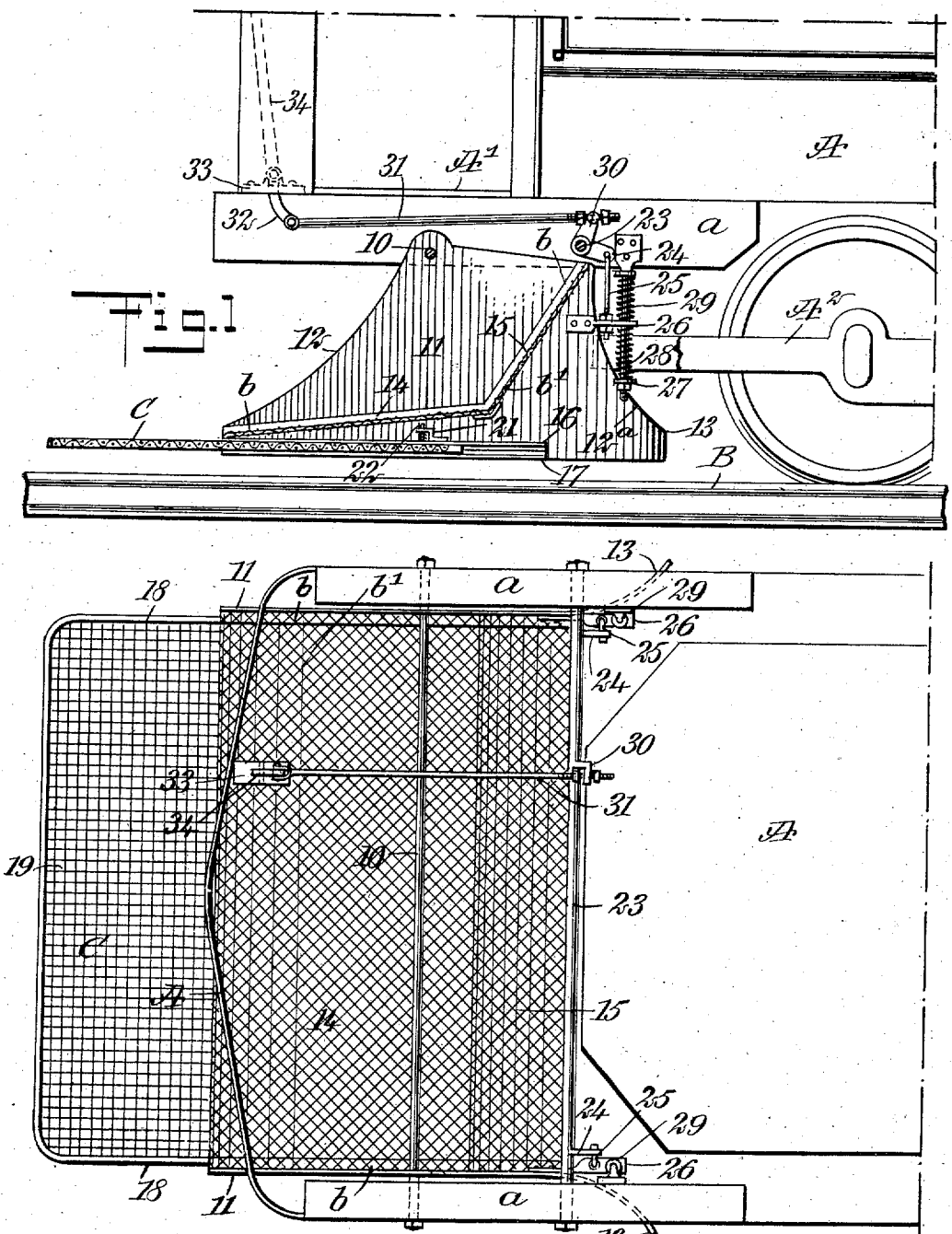
WITNESSES
INVENTOR
Charles R. Reeves
BY
ATTORNEYS

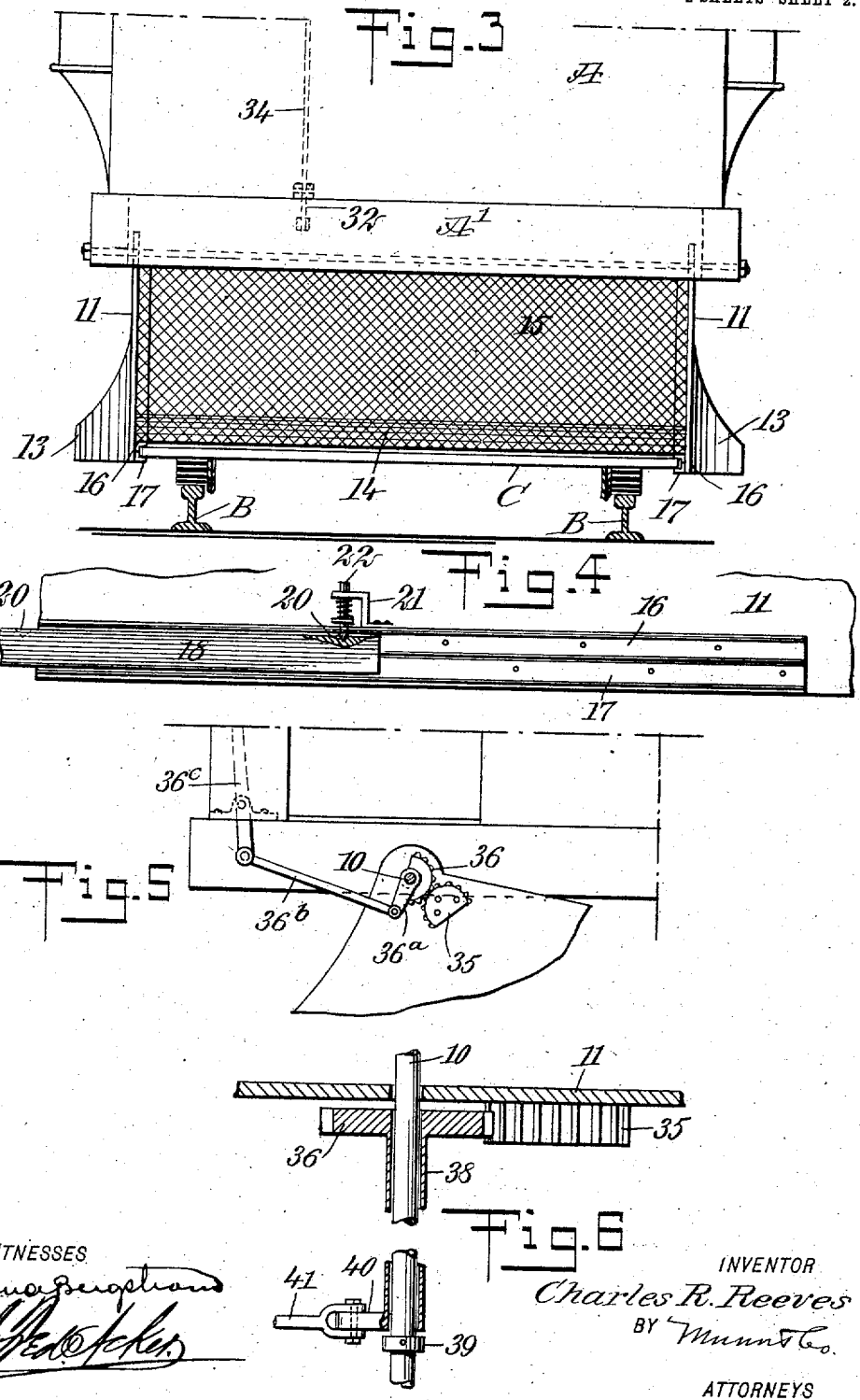

UNITED STATES PATENT OFFICE.

CHARLES RODERICK REEVES, OF FAIRHAVEN, MASSACHUSETTS.

CAR-FENDER.

No. 884,206.  Specification of Letters Patent.  Patented April 7, 1908.

Application filed August 8, 1907. Serial No. 387,615.

*To all whom it may concern:*

Be it known that I, CHARLES RODERICK REEVES, a citizen of the United States, and a resident of Fairhaven, in the county of Bristol and State of Massachusetts, have invented a new and useful Improvement in Car-Fenders, of which the following is a full, clear, and exact description.

The purpose of the invention is to provide a very simple and readily attached car fender, in the construction of which the bottom section is adjustable relatively to the body, so that its outer end may be brought within the vertical plane of the outer end of the platform, or be carried outward as far as desired and locked in either position.

Another purpose of the invention is to provide a construction of car fender whereby its forward end may be raised and lowered as occasion may demand.

The invention consists in the novel construction and combination of the several parts as will be hereinafter fully set forth and pointed out in the claims.

Reference is to be had to the accompanying drawings forming a part of this specification, in which similar characters of reference indicate corresponding parts in all the figures.

Figure 1 illustrates the fender attached to a car, the fender being in vertical section; Fig. 2 is a plan view of the fender and that portion of the car to which it is attached; Fig. 3 is a front elevation of a portion of the car and the attached fender; Fig. 4 is a detail sectional view of a part of the side of the fender and a portion of the bottom section, illustrating the manner in which the said bottom section has sliding movement on the side sections and the manner of locking the bottom section in adjusted position; Fig. 5 is a detail view of a modified form of mechanism for raising and lowering the fender; and Fig. 6 is a sectional plan view of the mechanism shown in Fig. 5.

A represents a portion of the body of the car, A' the platform, A² a truck for the car, and B represents one of the tracks. A shaft 10 is secured in the sills $a$ that extend below the platform of the car, and on this shaft 10 the fender is adapted to rock.

The fender consists mainly of two side sections or cheek pieces 11 which at their forward portions are inclined downwardly and forwardly, as illustrated at 12 in the drawings, and at their rear portions they are given a downward and rearward inclination, as is shown at 12ª in the drawings, and each lower portion 13 of each cheek piece or side section 11 of the fender is curved outwardly so as to extend over and beyond the outer faces of the tracks B. The cheek pieces 11 are connected by a bottom section 14 and a back section 15; these sections are preferably constructed in one piece and comprise side angle irons $b$ attached to the inner face of the cheek pieces 11, and a body section $b'$ of a perforated or reticulated material. At the bottom portion of each cheek piece 11 a slide-way is constructed, and each slide-way is preferably formed by bringing together two angle irons 16 and 17, as is particularly shown in Figs. 3 and 4. These slide-ways accommodate an auxiliary movable bottom C which consists of side members 18 suitably connected, and a body section 19 of reticulated or perforated material.

The side members 18 of the auxiliary bottom C of the fender, are provided at suitable intervals with notches or recesses 20 in their upper edges, adapted to receive spring wrist pins 22 that are mounted in brackets 21 carried by the uppermost angle irons 16 of the said slide-ways, so as to lock the sliding bottom section C of the fender either in an outer position or in an inner position, and when the said sliding section C is in its inner position it is within the vertical plane of the front portion of the car.

A rock shaft 23 is mounted in the sills $a$ above the upper rear portion of the fender. This rock shaft 23 is provided adjacent each end with a crank arm 24, and these crank arms 24 are connected by links 25 with rearwardly extending members 26 that are secured to the rear portions of the cheek pieces 11, as is best shown in Fig. 1. Rods 27 are secured at their upper ends to the sills $a$, and these rods extend loosely through the said members 26, and springs 28 and 29 are made to encircle the said rod, the spring 28 having bearing against the under face of the member 26, and the spring 29 having bearing against the upper face of the said member, as is also clearly shown in Fig. 1, and these springs 28 and 29 serve to normally hold the fender in operative position, that is, with the sliding auxiliary bottom C parallel with the tracks B, and at a predetermined distance above them. Between the ends of the shaft 23 an upwardly extending crank arm 30 is formed, and this crank arm has connected with it the rear end of a bar 31 that extends below the platform A' of the car, and at the forward end of the said bar 31 a link 32 is pivoted, which link in its turn extends up through a suitable plate 33 secured to the said platform, and is attached to a lever 34. By drawing the lever inward the forward end of the fender is carried downward so as to facilitate the reception of an object on the track, and at such time the springs 29 are placed under compression, therefore when the lever is released the said springs restore the fender to its normal position.

In Figs. 5 and 6 I have illustrated a modified form of a mechanism for raising and lowering the fender. This mechanism consists of segmental gears 35 secured to the inner faces of the cheek pieces 11 of the fender adjacent its pivotal support 10, and the said support 10 in this instance is adapted to turn in its bearings and is provided with a mating segmental gear 36 and a crank arm 36$^a$ which is connected by a link 36$^b$ with a lever 36$^c$ corresponding to the lever 34; but the pivotal support 10 may be rigid, in which event the gear 36 is provided with a sleeve 38 and is loosely mounted on the said pivotal support, and at the inner end of the said sleeve, a collar 39 is secured on the said pivotal support 10, as is shown in Fig. 6, and a crank arm 40 is then secured to the said sleeve and connected by a link 41 with a suitable lever.

Having thus described my invention, I claim as new and desire to secure by Letters Patent,—

1. In a car fender, pivotally mounted cheek pieces, a fixed bottom and back section connecting the cheek pieces, an auxiliary bottom mounted to slide on the cheek pieces, a locking device for the auxiliary bottom, and means for rocking the fender on its pivotal support.

2. In a car fender, pivotally mounted cheek pieces, a fixed bottom and back section connecting the cheek pieces, an auxiliary bottom mounted to slide on the cheek pieces, a locking device for the auxiliary bottom, and means for rocking the fender on its pivotal support, and a tensioning mechanism that retains the fender in normal position, being compressed when the fender is rocked.

3. In a car fender, the combination with pivotally mounted cheek pieces, a bottom and a back section secured to the said cheek pieces, slide-ways located at the bottom inner portion of the cheek pieces, an auxiliary bottom member fitted to the said slide-ways, and a locking device for the said auxiliary bottom member of a rock shaft, a lever connected with said shaft, crank arms extending from said rock shaft, members extending rearwardly from the cheek pieces, links connecting the said members and the said crank arms, and springs having bearing upon the upper and the lower faces of the said rearwardly extending members.

4. In a car fender, the combination with cheek pieces and a stationary bottom and back sections located between the cheek pieces, of an auxiliary sliding bottom, and a locking device therefor.

In testimony whereof I have signed my name to this specification in the presence of two subscribing witnesses.

CHARLES RODERICK REEVES.

Witnesses:
EDWARD T. BANNON,
MARY L. SAWYER.